US008621862B2

(12) United States Patent
Sprenger et al.

(10) Patent No.: US 8,621,862 B2
(45) Date of Patent: Jan. 7, 2014

(54) REMOTE COOLING SYSTEM FOR CHARGE-AIR COOLED ENGINES

(75) Inventors: Michael W. Sprenger, East Troy, WI (US); Matthew L. Warnick, Humboldt, TN (US)

(73) Assignee: Wabtec Holding Corp., Wilmerding, PA (US)

( * ) Notice: Subject to any disclaimer, the term of this patent is extended or adjusted under 35 U.S.C. 154(b) by 1003 days.

(21) Appl. No.: 12/095,149

(22) PCT Filed: Dec. 6, 2006

(86) PCT No.: PCT/US2006/046594
§ 371 (c)(1),
(2), (4) Date: Sep. 10, 2008

(87) PCT Pub. No.: WO2007/067646
PCT Pub. Date: Jun. 14, 2007

(65) Prior Publication Data
US 2009/0314263 A1 Dec. 24, 2009

Related U.S. Application Data (60) Provisional application No. 60/742,950, filed on Dec. 6, 2005.

(51) Int. Cl.
*F02B 29/04* (2006.01)
*F01K 23/06* (2006.01)
(52) U.S. Cl.
USPC .............................. 60/599; 60/604; 123/41.31
(58) Field of Classification Search
USPC ................... 60/599, 604; 123/41.31, 41.51
See application file for complete search history.

(56) References Cited

U.S. PATENT DOCUMENTS

| 3,829,235 | A | 8/1974 | Woollenweber, Jr. |
| 3,857,151 | A | 12/1974 | Young et al. |
| 3,934,644 | A * | 1/1976 | Johnston ........................ 165/51 |
| 4,010,613 | A | 3/1977 | McInerney |
| 5,150,520 | A | 9/1992 | DeRisi |
| 5,378,294 | A | 1/1995 | Rissanen |
| 5,429,794 | A | 7/1995 | Kamf et al. |
| 6,264,764 | B1 | 7/2001 | Kamf et al. |
| 6,758,266 | B1 | 7/2004 | Sjunnesson et al. |
| 6,883,314 | B2 * | 4/2005 | Callas et al. .................... 60/599 |
| 6,910,529 | B2 * | 6/2005 | Stone et al. .................... 165/299 |
| 6,997,371 | B2 | 2/2006 | Shabtay |
| 7,003,879 | B2 | 2/2006 | Smith et al. |

(Continued)

OTHER PUBLICATIONS

Technical Data Sheet, BrazeTec CTF 600; Oct. 21, 2005.

(Continued)

*Primary Examiner* — Hoang Nguyen
(74) *Attorney, Agent, or Firm* — The Webb Law Firm (57) ABSTRACT

A remote cooling system (10) for cooling turbocharged compressed air from a charge-air cooled engine (12) which is placed within an enclosed environment. The cooling system (10) comprises a charge-air cooler (14) located a predetermined distance from the engine (12). The charge-air cooler (14) comprises a fluid receiver (16) which receives turbocharged air from the engine 12, an air-to-water heat exchanger (24) which cools the turbocharged air received from the fluid receiver (16), and a fluid return member (26) for returning cooled air to the engine (12). A secondary cooling device (34), located outside of the enclosed environment, provides heat transfer from the heat exchanger (24) within the charge-air cooler (14) to an external environment.

20 Claims, 6 Drawing Sheets

(56) References Cited

U.S. PATENT DOCUMENTS

| | | |
|---|---|---|
| 7,032,808 B2 | 4/2006 | Shabtay |
| 7,036,570 B2 | 5/2006 | Korth et al. |
| 7,182,049 B2 * | 2/2007 | Wikstrom ................. 123/41.31 |
| 7,617,679 B2 * | 11/2009 | Kardos et al. ............... 60/605.2 |
| 2003/0033993 A1 | 2/2003 | Valaszkai et al. |
| 2005/0283967 A1 | 12/2005 | Panthofer |
| 2006/0249559 A1 | 11/2006 | Panthofer |

OTHER PUBLICATIONS

Cupro-Flo™ 100; Lucas-Milhaupt Inc.; pp. 1-4; Dec. 2004.

* cited by examiner

REMOTE COOLING SYSTEM FOR CHARGE-AIR COOLED ENGINES

BACKGROUND OF THE INVENTION

1. Field of the Invention

The present invention relates generally to cooling systems and devices for use in connection with engines and similar heat-generating devices and, in particular, to a remote cooling system and arrangement for use in connection with charge-air cooled engines.

2. Background of the Invention

Traditional charge-air cooling systems and arrangements used in connection with high horsepower engines include a two-stage system, where charge-air is cycled through a block mounted air-to-water charge-air cooler, and water is then cooled by a radiator. Such charge-air cooling systems are constructed as an integral part of the engine itself, as a packaged component from the engine manufacturer. Accordingly, such systems are not capable of deconstruction and use in connection with other applications and cooling systems.

Ever increasing emission restrictions from the Environmental Protection Agency have forced manufacturers to design engines having reduced fossil fuel emissions, such as nitrous oxide, carbon dioxide, carbon monoxide, and hydrocarbons, while increasing fuel economy. In order to stay ahead of emissions legislation while meeting performance expectations of their customers, engine designers have began using air-to-air charge cooling. Presently-designed engines, such as Tier II engines in the vehicle industry, utilize air-to-air charge-air cooling for inlet air from a turbocharger.

Outside of the vehicle manufacturing and production industry, engines are used in a variety of applications and fields. Certain engine installations, such as in the power generation industry, require remote and non-integral cooling systems. For example, such remote cooling systems are necessary when the engine is located within a building or structure, such as a basement, enclosed room or other structure, for preventing the engine from exposure to the environmental elements. In such an application, the use of a single-stage air-to-air cooling system, such as with Tier II or the newer Tier III type engines, is not possible, as it would require that the heat from the charge-air be transferred into the enclosed structure. Such a situation would not be practical, since the enclosed area would become heated, and this heat would require removal by some other means.

In the enclosed structure application, another option would be to pipe or transfer the charge-air to the air-to-air charge-air cooling system. In this manner, the heat would be transferred to the environment exterior to the enclosed structure. However, such an arrangement is neither efficient nor practical. In particular, such a system would increase the internal air pressure drop and, thus, reduce the performance and efficiency of the engine.

Due to these limitations, the higher performance engines, such as the Tier II type of engine, cannot be used in the enclosed structure environment. Accordingly, the use of engines within the enclosed structure environment requires the use of traditional charge-air cooling systems that include a two-stage system wherein the cooling components are constructed as an integral part of the engine itself as a packaged component from the engine manufacturer. In addition to lower engine performance levels, these systems have additional disadvantages as discussed above.

SUMMARY OF THE INVENTION

Therefore, it is an object of the present invention to provide a cooling system that overcomes the deficiencies of the prior art. It is another object of the present invention to provide a cooling system for use in connection with an air-to-air charge-air engine. It is a further object of the present invention to provide a cooling system for use in connection with an engine installation, where the cooling system is remote from and not integral with the engine. It is yet another object of the present invention to provide a cooling system that is useful in connection with an engine or other heat-generating device that is positioned in an enclosed structure. It is yet another object of the present invention to provide a remote cooling system that does not significantly reduce efficiency or heat an internal environment.

Accordingly, the present invention is directed to a cooling system for use in connection with a heat-generating device, such as a charge-air engine and the like. In particular, the cooling system of the present invention utilizes a high-efficiency local air-to-water charge-air cooling device that is located a predetermined distance from the engine and uses a secondary water loop to remove heat via a remote cooling device to an external environment. Such a unique arrangement provides a high performance engine that is generally cooled via an air-to-air charge-air (aftercooled) system to be utilized in an installation wherein the engine is located in an enclosed environment that would require a remote cooling system.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, spatial or directional terms shall relate to the invention as it is oriented in the drawing FIGS. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

The embodiment of the invention is a cooling system for use in connection with a variety of heat generating devices, such as a charge-air engine, that is typically cooled by an air-to-air cooling system, including a high performance/low emission Tier II or Tier III engine, but wherein the engine is in an enclosed environment and thus an air-to-air cooling system would be impractical for cooling the engine. As shown in the drawings, the embodiment of the invention includes a charge-air cooling device and a remote secondary cooling device, such as a radiator device, to cool and remove the heat generated by the engine. Neither the charge-air cooling device nor the secondary cooling device is attached to or integral with the engine; however, the charge-air cooling device and the secondary cooling device both effectively and efficiently cool the engine and transfer the heat from the engine to an outside environment.

Figure 1:
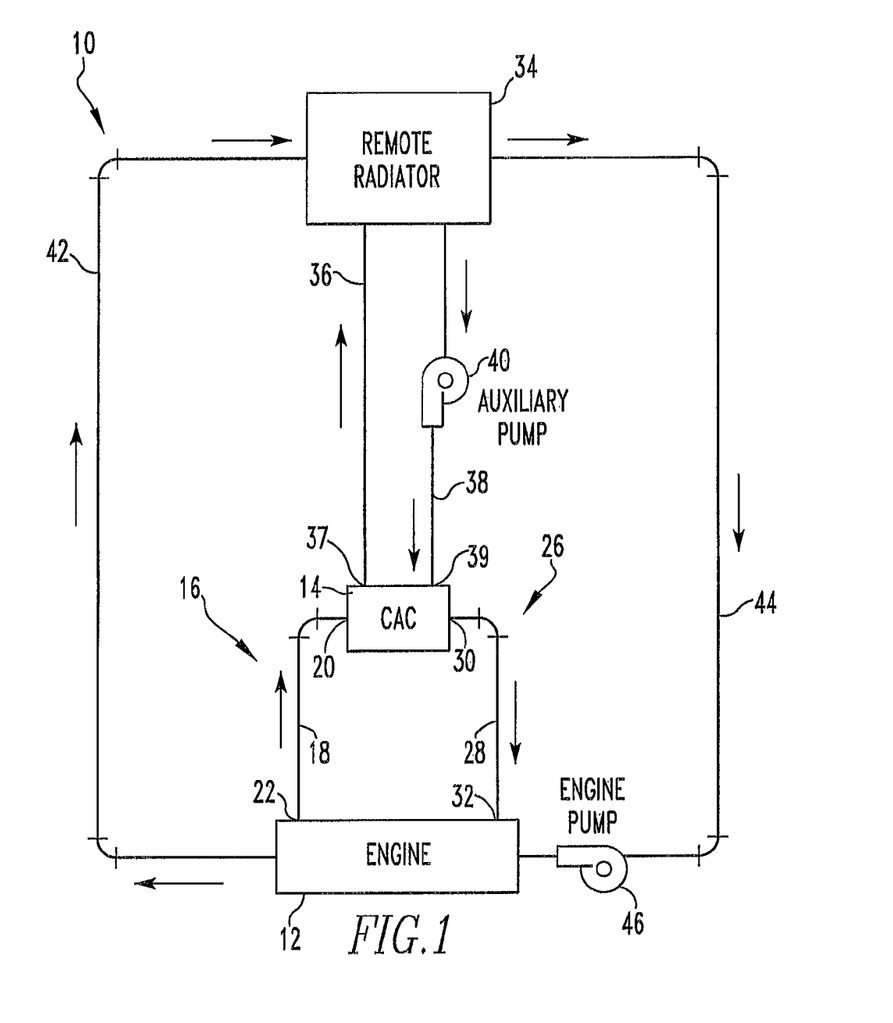
FIG. 1 is a schematic view of the overall remote cooling system coupled with an engine in accordance with the present invention.
Figure 2:
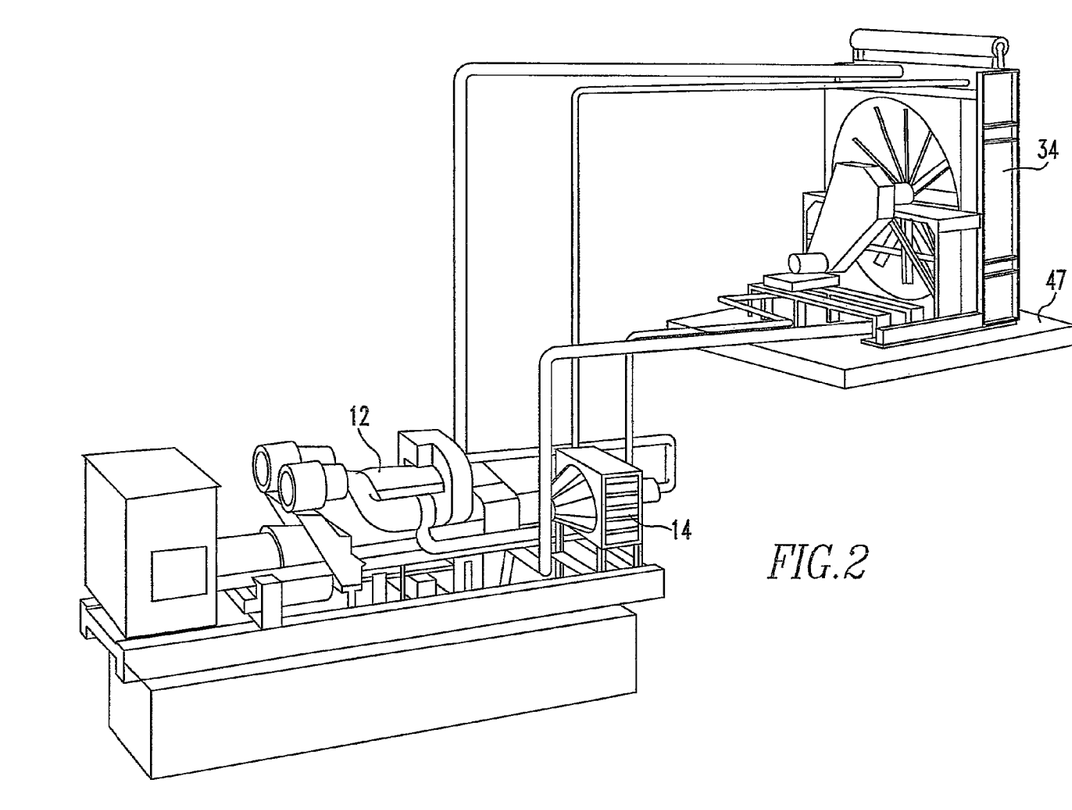
FIG. 2 is a plan view of the overall remote cooling system coupled with an engine in accordance with the present invention.
Figure 3:
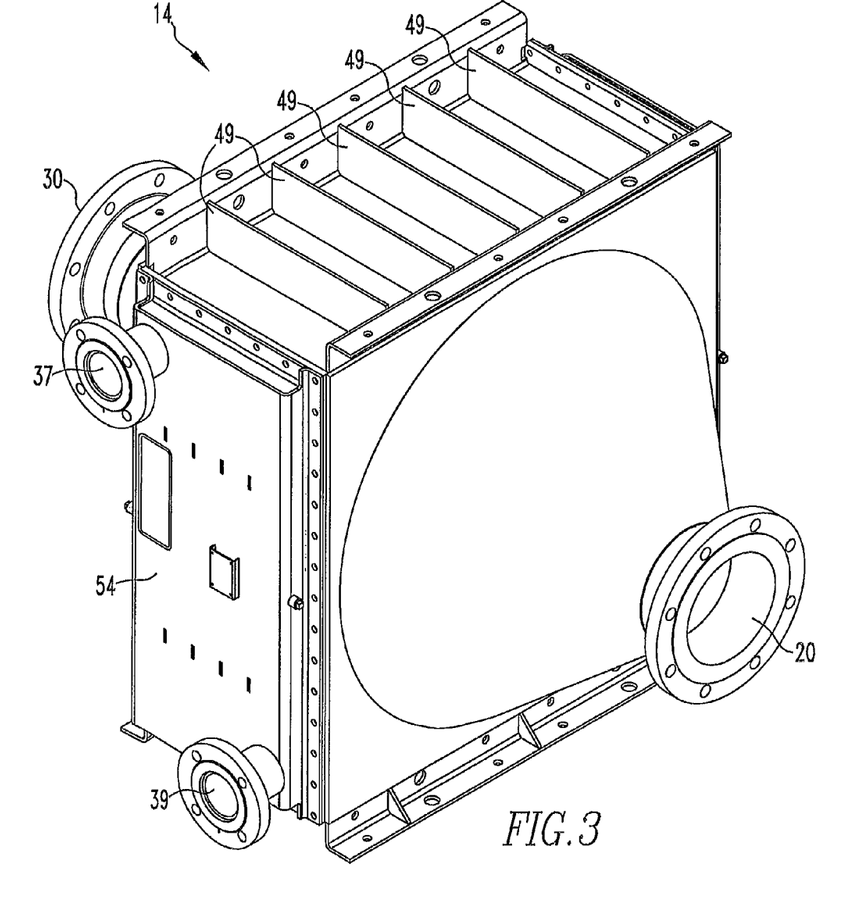
FIG. 3 is a perspective view of the charge-air cooler used in the cooling system of FIG. 2.
Figure 4:
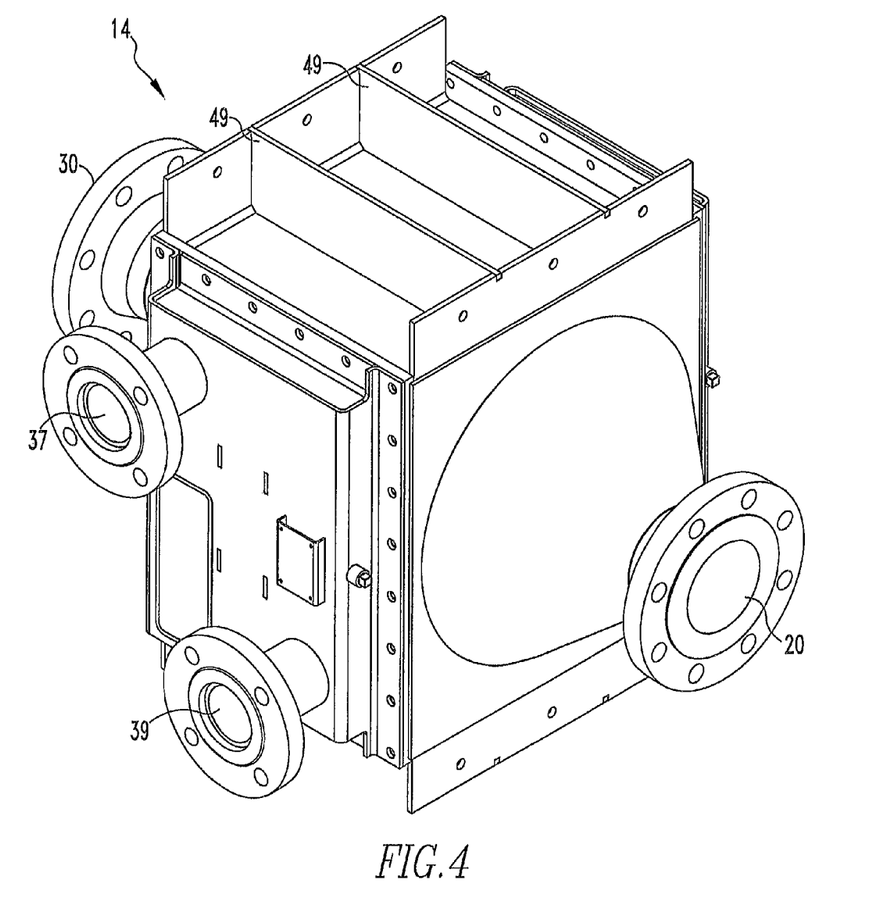
FIG. 4 is a perspective view of the charge-air cooler according to an alternative design that can be used in the cooling system of FIG. 2.
Figure 5:
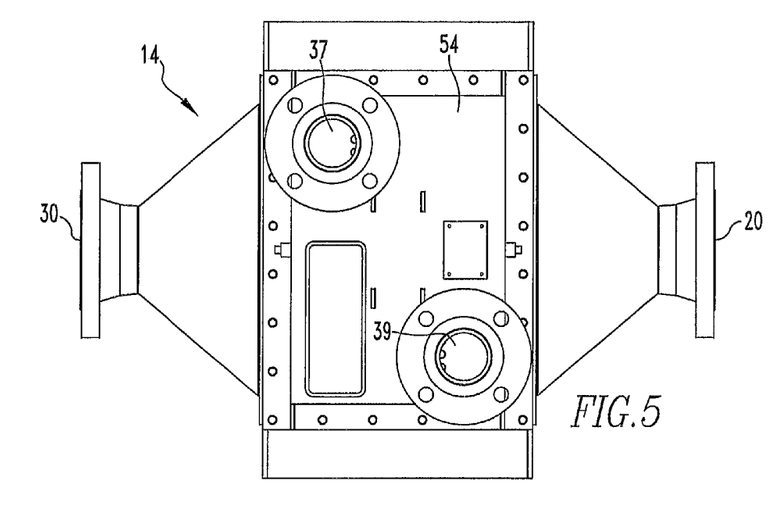
FIG. 5 is a top view of the charge-air cooler of FIG. 4.

Reference is now made to FIGS. 1 and 2, which show an overall remote cooling system, generally indicated as 10, coupled with an engine 12, such as a charge-air cooled engine, for cooling the turbocharged compressed air exiting the engine 12. The cooling system 10 includes a charge-air cooler 14 located a predetermined distance from the engine. The charge-air cooler 14 is shown in detail in FIGS. 3-6. Note that FIGS. 3 and 4 differ only in the number of side fins 49 on the charge-air cooler 14. The number of side fins 49 can vary depending upon the internal pressure seen by the charge-air cooler 14 as the fins 49 act to increase the stiffness of the side member thereby increasing the durability of the charge-air cooler 14. For example, less internal pressure would require fewer side fins 49.

Figure 6:
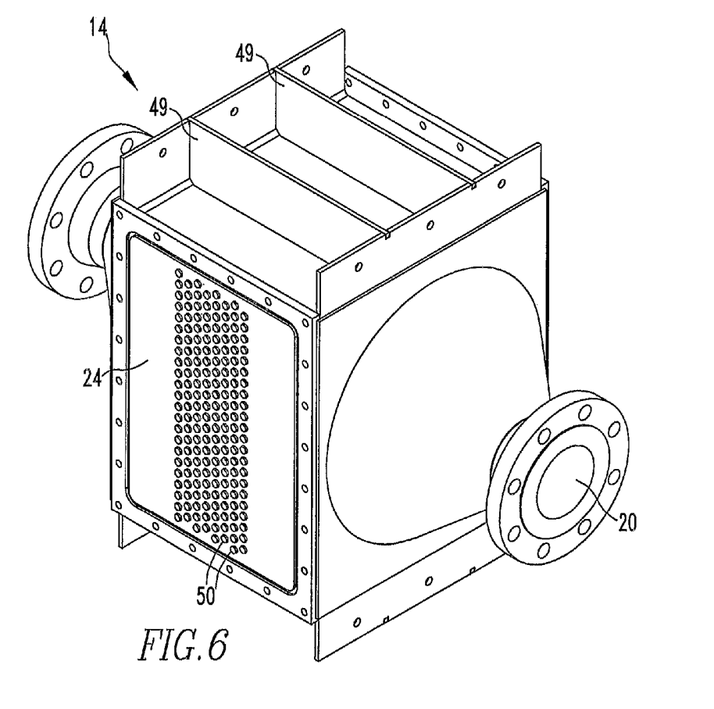
FIG. 6 is a perspective view of the charge-air cooler of FIG. 4 with the header removed to view the tube arrangement within the cooler.

The charge-air cooler comprises a fluid receiver, generally indicated as 16, which receives turbocharged air from the engine 12. This fluid receiver 16 comprises tubing 18, as is well known in the art, coupled between an inlet 20 in the charge-air cooler 14 and an outlet 22 in the engine 12. A heat exchanger 24, as shown in FIG. 6, is provided for cooling the turbocharged air received from the fluid receiver 16. This heat exchanger 24 is in the form of an air-to-water heat exchanger discussed in detail below. A fluid return member, generally indicated as 26, is provided for returning the cooled air to the engine 12. This fluid return member 26 comprises tubing 28, as is well known in the art, coupled between an outlet 30 in the charge-air cooler 14 and an inlet 32 in the engine 12.

A secondary cooling device, such as a radiator 34, provides heat transfer from the heat exchanger 24, within the charge-air cooler 14, to an external environment. The radiator 34 is mounted a predetermined distance from the charge-air cooler 14, such as for example, outside of the enclosed environment on a roof 47 of the building as shown in FIG. 2. Conventional tubing may be provided for cycling the heated liquid into the radiator via a tube 36 and a cooled liquid via a tube 38 back into the charge-air cooler 14. An outlet 37 is provided in the charge-air cooler 14 for feeding the heated liquid out of the charge-air cooler 14 into tube 36 and an inlet 39 is provided in the charge-air cooler 14 for receiving the cooled liquid therein. An auxiliary pump 40 may be provided for pumping cooled liquid from the radiator 34 to the charge-air cooler 14. The radiator 34 may further include means, such as tubing 42, for cycling jacket water coolant through the engine 12. An engine pump 46 may be provided for pumping jacket water coolant from the radiator 34 to the engine 12. An independent fluid pump can be used in a radiator aftercooled circuit to maintain the required gallons per minute for the charge-air cooling device 14. This arrangement is used when the engine pump 46 is not present. The charge-air cooling device 14 and radiator 34 are sized, shaped and operated to maintain the appropriate cooling and flow requirements of the heat-generating device or the engine 12.

As discussed above, the present invention is directed to a remote cooling system that can be used to cool engines which are located in an enclosed environment. The invention is particularly suitable for use with engines that are typically cooled using an air-to-air cooling system, but because the engines are being positioned in an enclosed environment, air-to-air cooling of the engine is not feasible. For that reason, an air-to-water cooling system is being used to cool these types of engines. The air-to-water cooling system is not mounted directly on the engine block, but rather is a separate unit that is positioned a predetermined distance from the engine. An example of this design is shown for example in FIG. 2 wherein the engine 12 is mounted on a sub-base 48 and the charge-air cooler 14 is mounted on this sub-base 48 at a predetermined distance away from the engine 12. In another preferred and non-limiting embodiment, the charge-air cooling device can be mounted within 5 feet of the engine, within 20 feet of the engine or at whatever distance is necessary for a particular environment as long as the appropriate pressure drop requirements are maintained, which is typically no greater than 1 psi.

Reference is now made to FIGS. 3-8, which show the details of the charge-air cooler 14 for use with the remote cooling system 10. The charge-air cooler 14 includes an air-to-water heat exchanger 24 that is discussed in further detail below. FIG. 6 shows the heat exchanger 24 with a header 54 removed to show the plurality of tubes 50 for the air-to-water cooling system.

A first preferred technique for attaching these tubes 50 to fins 52 of the heat exchanger 24 is by a mechanical attachment wherein the individual tubes 50 are mechanically expanded or balled into the fins 52 having similar hole geometry to provide the tube-to-fin connection. The ends of the tubes 50 may also be mechanically attached to the header 54 in this same manner. This expansion technique for constructing a heat exchanger is discussed in detail in U.S. Pat. No. 3,857,151 to Young et al.

A second preferred technique for attaching the tubes 50 to the fins 52 of the heat exchanger 24 and for attaching the ends of the tubes 50 to the header 54 is a technique known as a CUPROBRAZE™ technique. CUPROBRAZE™ is a manufacturing process that is used to braze copper and brass at temperatures that are generally lower than normal brazing operations but do not exceed the softening temperatures of the components being joined. This process involves depositing a braze paste on the tubes or fins, which are then assembled and heated to a suitable brazing temperature. The paste used as the brazing compound is known as OKC 600, as discussed in U.S. Pat. No. 5,378,294 to Rissanen and U.S. Pat. Nos. 5,429,794 and 6,264,764 to Kamf et al. This compound contains binders and a metal braze alloy based on the CuSnNiP system, for example, about 75% copper, about 15% tin, about 5% nickel, and about 5% phosphorus. Other compounds and methods are being developed for use with the CUPROBRAZE™ technique. These compounds are the subject of U.S. Pat. Nos.

7,032,808 and 6,997,371 to Shabtay and U.S. Patent Application Publication Nos. 2005/0283967 and 2006/0249559 to Panthofer.

It is noted that the heat exchanger 24 of the present invention is not limited to the tube-to-fin and tube-to-header attachment techniques discussed above. Other types of attachment techniques may be utilized for attachment of the tubes to the fins and the headers such as welding, soldering, adhesive and the like.

During the construction of the heat exchanging means 24 of the invention, it was determined that when utilizing the CUPROBRAZE™ process, it was necessary to add a small percentage of iron to the copper alloy tube to make it "anneal resistant". In the application of the CUPROBRAZE™ process as it pertains to this invention, it is necessary to anneal the tube to get it to properly form into the correct shape and mechanically roll to the joint. It was found that the grain size of the material had to be increased at the tube end so that it did not "work harden" during transforming and prematurely fail due to cyclic fatigue in the end user application or during testing.

The air-to-water heat exchanger 24 can include a fin core constructed according to any known structure including a serpentine, square wave, corrugated fin or oval tube arrangement.

Figures 7, 8:
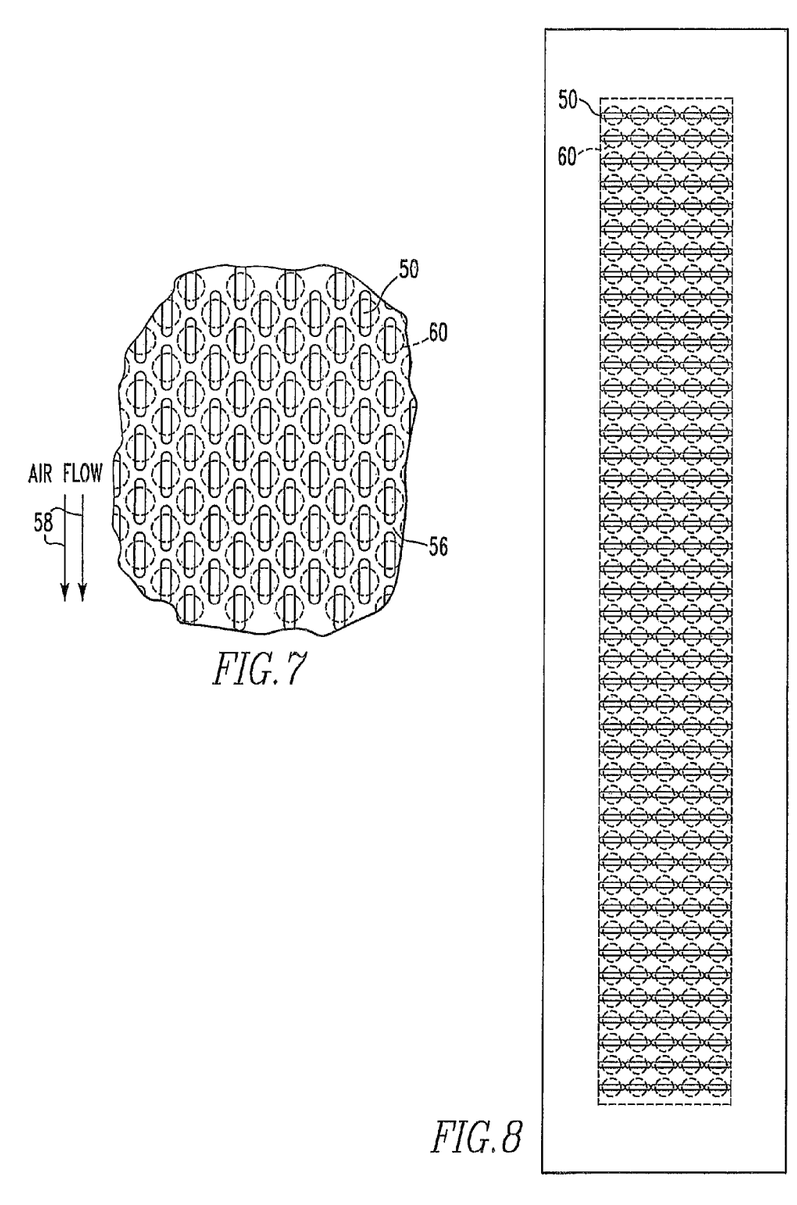
FIG. 7 is a first embodiment of an end view of the tube column layout for a staggered array tube design which can be used in the charge-air cooler of FIG. 4.
FIG. 8 is a second embodiment of an end view of the arrangement of tubes using "end-to-end" or "tube touching" positioning of the tubes for row spacing which can be used in the charge-air cooler of FIG. 3.

The air-to-water heat exchanger 24 can be constructed according to a first embodiment wherein the plurality of tubes 50 can be configured in a staggered arrangement, as shown in detail in FIG. 7. This design is the subject of U.S. Pat. No. 7,003,879 to Smith et al. This design enables an increase in the airflow around the tubes 50 and increases a web 56 in the header 54 around the tubes 50. In this design the plurality of tubes 50 having an end configuration is arranged in a predetermined staggered array. The header 54 is provided with a predetermined number of openings 60 disposed in the predetermined staggered array corresponding to the plurality of tubes 50. The header 54 is formed by identifying a direction of airflow, determining at least one of a row pitch and a tube pitch of the predetermined number of openings, and aligning at least one of the row pitch and the tube pitch with respect to the airflow. The plurality of tubes 50 is arranged such that the row pitch and tube pitch are spaced substantially identical. A securing system is provided for securing an end of each of the plurality of tubes 50 within a corresponding opening 60 in the header 54. This securing system can be any process, e.g., mechanical, CUPROBRAZE™, solder, and the like, as discussed in detail above.

A second embodiment for constructing the air-to-water heat exchanger 24 is disclosed in U.S. Pat. No. 7,036,570 to Korth et al. In this technique, an "end-to-end" or "tube touching" position of the tubes is used for the row spacing. This arrangement is illustrated in FIG. 7. In this technique, core structure of the heat exchanger comprises a plurality of tubes 50 having a predetermined end configuration, a header 54 having a number of openings 60 corresponding to the plurality of tubes such that the openings 60 are disposed in an end-to-end array and wherein the predetermined end configurations touch, and a securing system for securing an end of each of the plurality of tubes 50 into a corresponding one of the each of the openings 60 in the header 54. This securing system can comprise any of the processes discussed in detail above.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of the invention. For example, it is to be understood that the present invention contemplates that, to the extent possible, one or more features of any embodiment can be combined with one or more features of any other embodiment.

The invention claimed is:

1. A remote cooling system for cooling turbocharged compressed air from a charge-air cooled engine, said cooling system comprising:
   (a) a charge-air cooler located a predetermined distance from said engine, said charge-air cooler comprising:
      (i) a fluid receiver which receives turbocharged air from said engine;
      (ii) a heat exchanger which cools said turbocharged air received from said fluid receiver; and
      (iii) a fluid return member which returns said cooled air from said charge-air cooler directly to said engine;
   (b) a secondary cooling device to provide heat transfer of coolant received from said heat exchanger within said charge-air cooler to an external environment and for supplying cooled coolant directly to the charge-air cooler; and
   (c) a cycling system associated with the secondary cooling device, said cycling system capable of cycling jacket water coolant through said engine and for providing heat transfer of the jacket water coolant exiting from the engine to the external environment,
   wherein said engine is located in an enclosed building which prevents exposure of the engine to environmental elements and said secondary cooling means is located outside of said enclosed building.

2. The remote cooling system as recited in claim 1 wherein said fluid receiver comprises an inlet within said charge-air cooler, an outlet within said engine, and a tubular member in fluid communication with said charge-air cooler inlet and said engine outlet.

3. The remote cooling system as recited in claim 1 wherein said fluid return member comprises an outlet within said charge-air cooler, an inlet within said engine, and a tubular member in fluid communication with said charge-air cooler outlet and said engine inlet.

4. The remote cooling system as recited in claim 1 wherein said heat exchanger comprises an air-to-water cooling system.

5. The remote cooling system as recited in claim 4 wherein said air-to-water cooling system comprises a plurality of tubes mechanically expanded or balled into fins having similar hole geometry to provide a tube-to-fin connection.

6. The remote cooling system as recited in claim 4 wherein said air-to-water cooling system comprises a plurality of tubes mechanically expanded or balled into holes within the header to provide a tube-to-header connection.

7. The remote cooling system as recited in claim 4 wherein said air-to-water cooling system comprises a plurality of tubes joined to fins and a header utilizing a brazing process comprising a metal braze alloy based on a CuSnNiP system.

8. The remote cooling system as recited in claim 7 wherein said plurality of tubes are comprised of a brass alloy containing a small percentage of iron to cause said tube to become anneal resistant.

9. The remote cooling system as recited in claim 4 wherein said air-to-water cooling system includes a fin core constructed according to one of a serpentine, square wave, corrugated fin, and oval tube arrangement.

10. The remote cooling system as recited in claim 4 wherein said air-to-water cooling system comprises a plurality of tubes having an end configuration, said plurality of tubes arranged in a predetermined staggered array, a header having a predetermined number of openings disposed in said predetermined staggered array corresponding to said plurality of tubes, and a securing system which secures an end of each of said plurality of tubes within a corresponding opening of said header.

11. The remote cooling system as recited in claim 4 wherein said air-to-water cooling system comprises a plurality of tubes having a predetermined end configuration, a header having a number of openings corresponding to said plurality of tubes such that said openings are disposed in an end-to-end array and wherein said predetermined end configurations touch, and a securing system which secures an end of each of said plurality of tubes into a corresponding one of each of said openings in said header.

12. The remote cooling system as recited in claim 1 wherein said secondary cooling device comprises a radiator mounted a predetermined distance from said charge-air cooler.

13. The remote cooling system as recited in claim 1 including an auxiliary pump for pumping cooled fluid from said secondary cooling device to said charge-air cooler.

14. The remote cooling system as recited in claim 1 wherein said engine comprises a high performance low emission air-to-air cooled engine.

15. The remote cooling system as recited in claim 14 wherein said engine comprises a Tier II engine.

16. A remote cooling system for cooling turbocharged compressed air from a charge-air cooled engine, said cooling system comprising:
   (a) a charge-air cooler located a predetermined distance from said engine, said charge-air cooler comprising:
      (i) a fluid receiver which receives turbocharged air from said engine;
      (ii) an air-to-water heat exchanger which cools said turbocharged air received from said fluid receiver; and
      (iii) a fluid return member which returns said cooled air from said charge-air cooler directly to said engine; and
   (b) a secondary cooling device to provide heat transfer of coolant received from said heat exchanger within said charge-air cooler to an external environment and for supplying cooled coolant directly to the charge-air cooler,
   wherein said engine is located in an enclosed building which prevents exposure of the engine to environmental elements and said secondary cooling device is located outside of said enclosed building.

17. The remote cooling system as recited in claim 16 wherein said engine comprises a high performance low emission air-to-air cooled engine.

18. A remote cooling system for cooling turbocharged compressed air from a charge-air cooled engine, said charge-air cooled engine located within an enclosed building which prevents exposure of the engine to environmental elements, said cooling system comprising:
   (a) a charge-air cooler located a predetermined distance from said engine, said charge-air cooler comprising:
      (i) a fluid receiver which receives turbocharged air from said engine, said fluid receiver comprising an inlet within said charge-air cooler, an outlet within said engine, and a tubular member in fluid communication with said charge-air cooler inlet and said engine outlet;
      (ii) an air-to-water heat exchanger which cools said turbocharged air received from said fluid receiver; and
      (iii) a fluid return member which returns said cooled air to said engine, said fluid return member comprising an outlet within said charge-air cooler, an inlet within said engine, and a tubular member in fluid communication with said charge-air cooler outlet and said engine inlet to return said cooled air from said charge-air cooler directly to said engine; and
   (b) a secondary cooling device located outside of said enclosed building to provide heat transfer from said heat exchanger within said charge-air cooler to an external environment.

19. The remote cooling system as recited in claim 16 including a cycling system associated with the secondary cooling device, said cycling system capable of cycling jacket water coolant through said engine and for providing heat transfer of the jacket water coolant exiting from the engine to the external environment.

20. The remote cooling system as recited in claim 18 including a cycling system associated with the secondary cooling device, said cycling system capable of cycling jacket water coolant through said engine and for providing heat transfer of the jacket water coolant exiting from the engine to the external environment.

\* \* \* \* \*

UNITED STATES PATENT AND TRADEMARK OFFICE
CERTIFICATE OF CORRECTION

PATENT NO.        : 8,621,862 B2                           Page 1 of 1
APPLICATION NO.   : 12/095149
DATED             : January 7, 2014
INVENTOR(S)       : Sprenger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1217 days.

Signed and Sealed this
Twenty-second Day of September, 2015

Michelle K. Lee
*Director of the United States Patent and Trademark Office*